US012577416B2

(12) United States Patent
Kroehl et al.

(10) Patent No.: US 12,577,416 B2
(45) Date of Patent: Mar. 17, 2026

(54) PAINTS, PRINTING INKS, GRIND RESINS, PIGMENT CONCENTRATES OR OTHER COATING SUBSTANCES

(71) Applicant: EVONIK OPERATIONS GMBH, Essen (DE)

(72) Inventors: Oliver Kroehl, Cologne (DE); Gaetano Blanda, Haltern am See (DE); Stefan Silber, Krefeld (DE); Inga Husen, Dortmund (DE); Sandra Bittorf, Witten (DE); Philipp Isken, Altenberge (DE); Ulf Schoeneberg, Berlin (DE)

(73) Assignee: EVONIK OPERATIONS GMBH, Essen (DE)

( * ) Notice: Subject to any disclaimer, the term of this patent is extended or adjusted under 35 U.S.C. 154(b) by 1169 days.

(21) Appl. No.: 17/439,962

(22) PCT Filed: Mar. 13, 2020

(86) PCT No.: PCT/EP2020/056961
§ 371 (c)(1),
(2) Date: May 13, 2022

(87) PCT Pub. No.: WO2020/187788
PCT Pub. Date: Sep. 24, 2020

(65) Prior Publication Data
US 2022/0267619 A1 Aug. 25, 2022

(30) Foreign Application Priority Data
Mar. 18, 2019 (EP) ..................................... 19163511

(51) Int. Cl.
*C09D 7/80* (2018.01)
*G06N 3/08* (2023.01)

(52) U.S. Cl.
CPC .................................... *C09D 7/80* (2018.01); *G06N 3/08* (2013.01)

(58) Field of Classification Search
CPC ............... C09D 7/80; C09D 5/00; G06N 3/08
See application file for complete search history.

(56) References Cited

U.S. PATENT DOCUMENTS

| | | | |
|---|---|---|---|
| 5,046,020 | A | 9/1991 | Filkin |
| 6,421,612 | B1 | 7/2002 | Agrafiotis et al. |
| | | (Continued) | |

FOREIGN PATENT DOCUMENTS

| | | | |
|---|---|---|---|
| CN | 108305311 A | 7/2018 | |
| CN | 108875161 A | 11/2018 | |
| | | (Continued) | |

OTHER PUBLICATIONS

N. Rohani, E. Pouyet, M. Walton, O. Cossairt and A. K. Katsag-gelos, "Pigment Unmixing of Hyperspectral Images of Paintings Using Deep Neural Networks," ICASSP 2019—2019 IEEE International Conference on Acoustics, Speech and Signal Processing (ICASSP), Brighton, UK, 2019, pp. 3217-3221 (Year: 2019).*

(Continued)

*Primary Examiner* — James T Tsai

(74) *Attorney, Agent, or Firm* — Harness, Dickey & Pierce, P.L.C.

(57) ABSTRACT

The method includes using known compositions to train the convolutional neural network, a loss function being minimized for the training; examining whether the value of a loss function meets a predefined criterion, the following steps being carried out selectively in the case where the criterion is not met—selecting a test composition from a set of predefined test compositions by an active learning module; activating a chemical apparatus for producing and examining compositions for paints, varnishes, printing inks, grinding resins, pigment concentrates or other coating substances for the purpose of producing and examining the selected test composition; training the convolutional neural network, using the selected test composition and the properties (Continued)

thereof detected by the apparatus; generating a prediction composition for paints, varnishes, printing inks, grinding resins, pigment concentrates or other coating substances by inputting an input vector into the convolutional neural network; and outputting the prediction composition.

12 Claims, 4 Drawing Sheets

(56) References Cited

U.S. PATENT DOCUMENTS

| | | | | |
|---|---|---|---|---|
| 2005/0096796 A1* | 5/2005 | Filev | .................... | G05B 13/027 |
| | | | | 700/283 |
| 2006/0031027 A1 | 2/2006 | Alman | | |
| 2014/0244558 A1 | 8/2014 | Mohammadi et al. | | |
| 2014/0343909 A1 | 11/2014 | Guerillot | | |
| 2016/0313294 A1* | 10/2016 | Dattilo | ................... | G06Q 10/10 |
| 2017/0242570 A1* | 8/2017 | Beymore | ................ | G01J 3/463 |
| 2017/0352143 A1 | 12/2017 | Kompalli et al. | | |

FOREIGN PATENT DOCUMENTS

| | | | |
|---|---|---|---|
| JP | H10-055348 | A | 2/1998 |
| JP | 2004-189835 | A | 7/2004 |
| JP | 2008-509486 | A | 3/2008 |
| JP | 2011-506961 | A | 3/2011 |
| WO | WO-2017074455 | A1 | 5/2017 |

OTHER PUBLICATIONS

Office Action for Japanese Application No. 2021-556355 dated Dec. 5, 2023 and English translation.

International Search Report and Written Opinion of the International Searching Authority for International Application No. PCT/EP2020/056961 dated Apr. 29, 2020.

Office Action for Chinese Application No. 202080022225.0 dated Jun. 16, 2023.

A.J. Owens "Sensor Data Analysis Using Artificial Neural Networks," Arkun and Ray, Eds., Chemical Process Control CPC-IV, AIChE, New York, 1991 pp. 101-118.

Office Action for Chinese Application No. 202080022225.0 dated Mar. 3, 2022.

International Preliminary Report on Patentability and Written Opinion for PCT/EP2020/056961, dated Sep. 30, 2021.

* cited by examiner

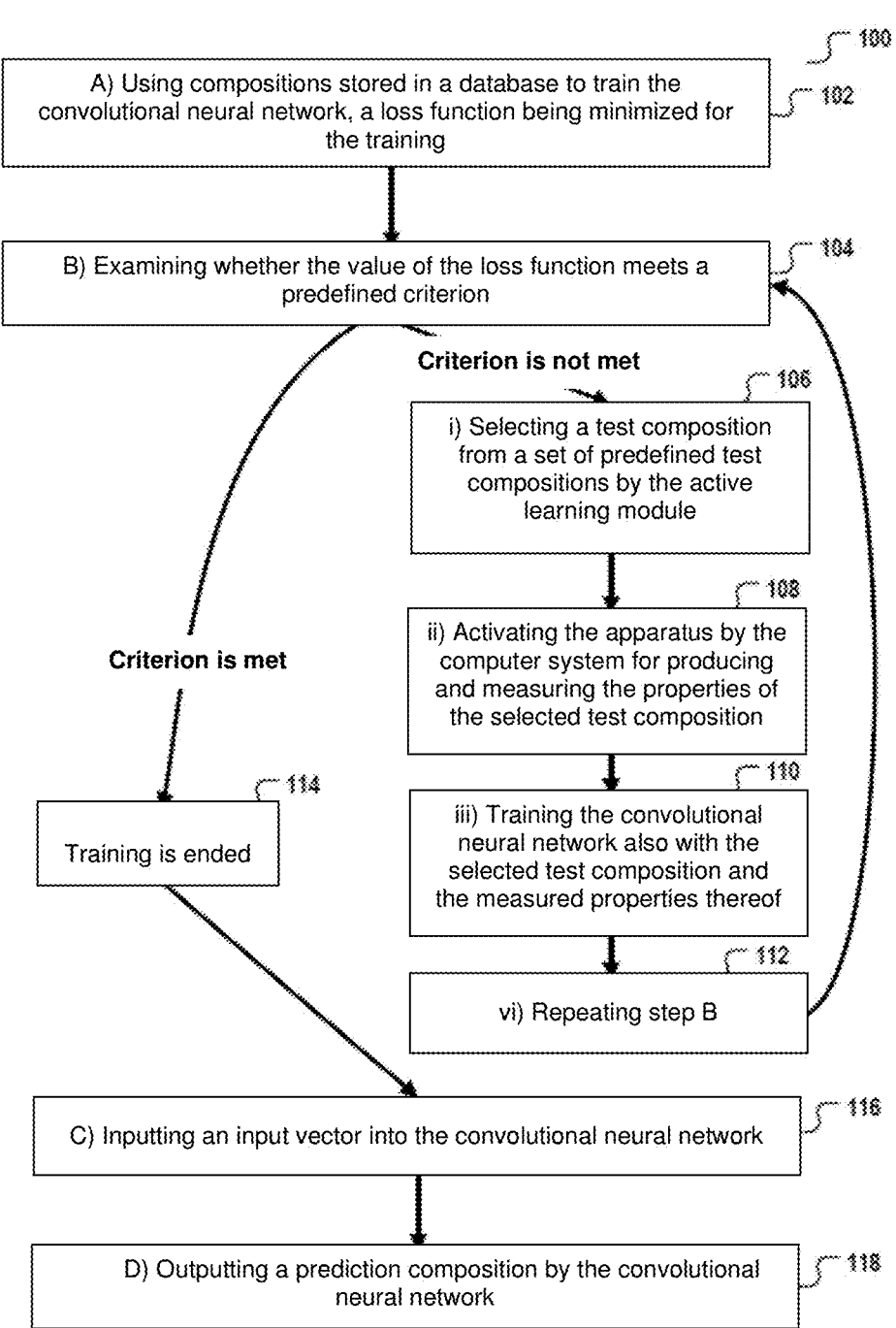

A) Using compositions stored in a database to train the convolutional neural network, a loss function being minimized for the training B) Examining whether the value of the loss function meets a predefined criterion Criterion is not met i) Selecting a test composition from a set of predefined test compositions by the active learning module ii) Activating the apparatus by the computer system for producing and measuring the properties of the selected test composition Criterion is met Training is ended iii) Training the convolutional neural network also with the selected test composition and the measured properties thereof vi) Repeating step B C) Inputting an input vector into the convolutional neural network D) Outputting a prediction composition by the convolutional neural network

Fig. 1

Desired
properties

Prediction
composition

PAINTS, PRINTING INKS, GRIND RESINS, PIGMENT CONCENTRATES OR OTHER COATING SUBSTANCES

CROSS-REFERENCE TO RELATED APPLICATIONS

This application is a national phase under 35 U.S.C. § 371 of PCT International Application No. PCT/EP2020/056961 which has an International filing date of Mar. 13, 2020, which claims priority to European Application No. 19163511.9, filed Mar. 18, 2019, the entire contents of each of which are hereby incorporated by reference.

TECHNICAL FIELD

The invention relates to a method for generating a composition for paints, varnishes, printing inks, grinding resins, pigment concentrates or other coating substances.

PRIOR ART

Compositions for paint, varnish and printing ink compositions, grinding resins, pigment concentrates and other coating substances are complex mixtures of raw materials. Conventional compositions or recipes or formulations for paints, varnishes, printing inks, grinding resins, pigment concentrates or other coating substances comprise approximately 20 raw materials, also referred to as "components" hereafter. These compositions are, for example, composed of raw materials selected from solids, such as pigments and/or fillers, binders, solvents, resins, hardening agents and various additives, such as thickeners, dispersants, wetting agents, adhesion promoters, defoamers, surface modifying agents, leveling agents, catalytically active additives, such as desiccants and catalysts, and specially acting additives, such as biocides, photoinitiators and corrosion inhibitors.

Thus far, new compositions, formulations and reformulations having certain, desired properties are specified based on empirical values and thereafter chemically synthesized and tested. The make-up of a new composition that meets certain expectations in terms of the chemical, physical, optical, haptic and other metrologically detectable properties thereof is also almost unpredictable for a person skilled in the art due to the complexity of the interactions. As a result of the wide range of interactions of the raw materials among one another, and associated therewith a plurality of failed tests, this procedure is both time-intensive and cost-intensive.

A cognitive computer system for producing chemical formulations is known from US 2018/0276348 A1. The system determines a chemical formulation that meets certain restrictions, and produces and tests the chemical formulation. This computer system is based on training a learning system, using existing data of chemical formulations. The creation of sufficiently large data records so as to train a learning logic using the same, however, is very complex, and due to the high time expenditure and material consumption also expensive. In many cases, it is also not possible to simply resort to a data record of already synthesized and analyzed compositions available in most laboratories. This may be due to a variety of reasons: the laboratory was newly established and does not yet have a corresponding data set. The laboratory is establishing a new product line, and does not yet have any experience and corresponding data records that relate to the properties of this new product line. Or data is available, but the scope thereof is not sufficient, or the data is too unbalanced ("biased") in terms of the historically evolved make-up thereof to be usable as a training data record.

As a result, the estimation and prediction with respect to the components of a composition having desired properties, both carried out by humans and those that are computer-assisted, are presently subject to very narrow boundaries. This applies in particular to complex compositions having many relevant properties and comprising many components, as is the case with paints, varnishes, printing inks, grinding resins, pigment concentrates or other coating substances, since the components interact with one another in a complex way, and determine the properties of the corresponding chemical products.

For this reason, new compositions at present first have to be actually chemically produced, and the properties thereof then have to be measured, to be able to assess whether the compositions have certain required properties. Even though approaches already exist for automatically forecasting properties of chemical substances, the creation of a training data record having a sufficient size and quality is often even more complex than it is to directly produce and test the composition in question. The development of new compositions in the field of paints, varnishes, printing inks, grinding resins, pigment concentrates or other coating substances is particularly complex and requires a lot of time.

SUMMARY

It is therefore the object of the present invention to provide a method by which the development of a new composition or the development of a reformulation is achieved in a more time-saving and more cost-effective manner.

The object is achieved by a method for generating a composition for paints, varnishes, printing inks, grinding resins, pigment concentrates or other coating substances according to claim 1, and by a corresponding computer system and computer program product. Embodiments of the invention are described in the dependent claims. Embodiments of the present invention can be freely combined with one another, unless they are mutually exclusive.

In one aspect, the invention relates to a method for generating a composition for paints, varnishes, printing inks, grinding resins, pigment concentrates or other coating substances. The composition is generated by a computer system. The computer system has access to a database in which known compositions, including the components and properties thereof, are stored. The computer system is connected to an apparatus for producing and examining compositions for paints, varnishes, printing inks, grinding resins, pigment concentrates or other coating substances. The computer system includes a convolutional neural network (CNN) and an active learning module. The method comprises the following steps:

a. using known compositions, stored in the database, to train the convolutional neural network, a loss function being minimized for the training;

b. examining whether the value of the loss function meets a predefined criterion, the following steps being carried out selectively in the case where the criterion is not met:

i. selecting a test composition from a set of predefined test compositions by the active learning module;

ii. activating the apparatus by the computer system for producing and examining the selected test composition;

iii. training the convolutional neural network, using the selected test composition and the properties thereof detected by the apparatus;

iv. repeating step b;

c. generating a prediction composition for paints, varnishes, printing inks, grinding resins, pigment concentrates or other coating substances by inputting an input vector into the convolutional neural network; and d. outputting the prediction composition by the convolutional neural network.

This can be advantageous since, in a fully or semi-automatic iterative process, an existing training data record can be incrementally and deliberately expanded by meaningful further training data in the form of test compositions and the empirically ascertained properties thereof, wherein renewed training of the neural network using the expanded training data record is carried out during each iteration, whereby the forecasting quality of the network is enhanced after each iteration until the loss function meets the criterion, that is, a prediction error of the network has become sufficiently small.

Due to the limited number of previously known compositions, the trained neural network obtained after the initial training phase is often not yet in a position to reliably forecast a prediction formulation that has a number of desired properties. The data set used is often too small for this purpose.

An expansion of the training data record by an active learning module allows just a few test compositions to be deliberately selected, which especially benefit the quality of the neural network and of the forecasts thereof. It is thus possible through an automatic and deliberate selection of test compositions that promise a particularly drastic enhancement of the predictive model of the neural network, as well as automatically executed synthesis and analysis steps based on the particular selected test composition, to quickly and efficiently enhance the predictive power of the neural network in multiple iterations. When it is established after an iteration that the loss function meets the criterion, an expansion of the training data record is no longer necessary, since the predictive power of the trained neural network can be regarded as being sufficient.

In another advantageous aspect, the active learning module, through the automatic selection of test compositions that particularly enhance the predictive power of the neural network, can expand the existing data inventories of known compositions so that a bias of the training data can be compensated for largely automatically.

According to embodiments of the invention, the set of the test compositions is automatically generated by a test planning program. For example, the test compositions can be automatically generated based on the known compositions, by adding or omitting components or by modifying the quantity or concentration of one or more components.

This can be advantageous since a very large number of test compositions can be automatically generated. In this way, a large data space can be spanned with candidate compositions. The data space spanned by the test compositions can, in particular, have the advantage that it is less biased when, for example, the test planning program is designed to generate the test compositions so that essentially each component is subjected to similar variations that cover a broad data space (removal, addition, change in concentration) so as to generate the test compositions.

According to embodiments of the invention, the components of the known compositions and/or of the test compositions are selected from the group consisting of solids, such as pigments and/or fillers, binders, solvents, resins, hardening agents and various additives, such as thickeners, dispersants, wetting agents, adhesion promoters, defoamers, surface modifying agents, leveling agents, catalytically active additives, and specially acting additives.

According to embodiments of the invention, the properties of the test formulation detected by the apparatus are selected from the group consisting of storage stability, pH value, rheology, in particular viscosity, density, relative mass, coloristics, in particular color strength, cost reduction during production, and improvement in the yield of pigments.

According to embodiments of the invention, the output of the prediction composition takes place on a user interface of the computer system. The user interface can be a monitor, a loudspeaker and/or a printer, for example.

This can be advantageous since the user is able to manually check the plausibility of the prediction composition again prior to the composition being transmitted to the chemical apparatus for the purpose of synthesis.

According to embodiments, the apparatus comprises at least two processing stations. The at least two processing stations are connected to one another via a transport system on which self-propelled transport vehicles can travel between the processing stations for transporting the components of the composition and/or the produced composition.

According to embodiments, the method furthermore comprises: inputting a composition into a processor which controls the apparatus, the composition input into the processor being the selected test composition or the prediction composition, the processor activating the apparatus to produce the input composition, the production of the input composition and a measurement of the properties of the input composition being carried out in the at least two processing stations, whereupon the measured properties are output on a user interface of the computer system and/or the measured properties are stored in the database. The processor can, for example, be the processor of a main control computer of the apparatus, which is an integral part of the apparatus or operatively connected thereto via a network.

The iterative synthesis and examination (determination of the properties) of the test composition for the expansion of the training data record can be advantageous since a fully automatic or, if user confirmation is required, semi-automatic system is provided for deliberately expanding a certain training data record already in existence for iteratively improving a neural network. The forecasting method based on the neural network thus improves independently, automatically, and iteratively through appropriate control of the chemical apparatus and automatic use of the empirical data thus generated for the expansion of the training data record.

The synthesis and examination (determination of the properties) of the prediction composition can be advantageous since a system is provided in which a user only has to specify the desired properties of the chemical product, and the ascertainment of the components required to do so and the generation of the product having the desired properties take place automatically, provided a prediction composition was able to be ascertained by the neural network for the required properties specified in the input vector.

According to embodiments, the computer system is designed to communicate via a communication interface with the database and/or the apparatus for producing and examining compositions for paints, varnishes, printing inks, grinding resins, pigment concentrates or other coating substances. The communication interface can be implemented by USB, Ethernet, WLAN, LAN, Bluetooth or another network interface.

According to embodiments, the compositions comprise formulations or consist of formulations.

In another aspect, the invention relates to a computer system for generating a composition for paints, varnishes, printing inks, grinding resins, pigment concentrates or other coating substances. The computer system comprises a database and a user interface and is configured to carry out a method for generating a composition according to embodiments of the invention.

In another aspect, the invention relates to a computer program, a digital storage medium or a computer program product including instructions executable by a processor which, when executed by the processor, prompt the processor to carry out a method for generating a composition according to embodiments of the invention.

In another aspect, the invention relates to a system that comprises the aforementioned computer system and an apparatus. The apparatus is an apparatus for producing and examining compositions for paints, varnishes, printing inks, grinding resins, pigment concentrates or other coating substances. The apparatus comprises at least two processing stations. The at least two processing stations are connected to one another via a transport system on which self-propelled transport vehicles can travel between the processing stations for transporting the components of the composition and/or the produced composition A "composition" here shall be understood to mean a specification of a chemical product that specifies at least the type of raw materials ("components") of which the chemical product is formed. When the production or examination of a composition is mentioned in the context of the present application, this shall be understood to mean in short that a chemical product is produced according to the information, as specified in the summary, regarding the components, and optionally also the concentrations thereof, or this chemical product is "examined," that is, the properties thereof are detected metrologically.

A "formulation" here shall be understood to mean a composition that, in addition to the information as to the components, additionally also comprises quantity or concentration information for the particular components.

A "known composition" shall be understood to mean a composition that specifies a chemical product, the properties of which, at the time of the training of a neural network, are known to the person or organization carrying out the training, since the known composition was already used once to produce a chemical product, and the properties of this product were empirically measured. The measurement does not necessarily have to have been carried out by the operator of the chemical laboratory which is now ascertaining the prediction composition, but can also have been carried out and published by other laboratories, so that, in this case, the properties are derived from the technical literature. Since a composition according to the above definition also includes formulations, serving as a subset, the "known compositions" according to embodiments of the invention can also include "known formulations" or be "known formulations."

A "test composition" shall be understood to mean a composition that specifies a chemical product, the properties of which, at the time of the training of the neural network, are not known to the person or organization carrying out the training. A test composition can, for example, be a composition that was specified manually or automatically, however that was not yet used to also actually produce a corresponding chemical product. Accordingly, the properties of this product are also not known. Since a composition according to the above definition also includes formulations, serving as a subset, the "test compositions" according to embodiments of the invention can also include "test formulations" or be "test formulations."

A "prediction composition" here shall be understood to mean a composition for which a trained neural network forecasts (predicts) that this specifies a chemical product, the properties of which correspond to a specification of desired properties predefined by a user. For example, the specification of the desired properties can be provided to the neural network as an input vector, which indicates a desired or acceptable parameter value or parameter value range for each of the desired properties.

A "database" here shall be understood to mean any data memory or memory area in which data, in particular structured data, is stored. The database can be one or more text files, spreadsheet files, a directory in a directory tree, or a database of a relational database management system (DBMS), such as MySQL or PostgreSQL.

A "loss function" (also referred to as "target function") of a forecasting problem is a function that is used during the training of a neural network and outputs a value, the absolute value of which provides an indication of the quality of the predictive model of the trained neural network and which is to be minimized during the course of the training, since the absolute value of this value indicates the faultiness of the forecasts of the neural network.

An "apparatus" for producing and examining compositions here shall be understood to mean a system that is composed of multiple laboratory devices and a transport unit and that is in a position to jointly control the laboratory devices and the transport unit in an orchestrated manner to automatically or semi-automatically carry out a chemical workflow. The workflow can be a synthesis workflow, for example, or an analysis workflow, or a combination of both workflows.

An "examination of compositions" by the apparatus shall be understood to mean the metrological detection ("analysis") of properties of a chemical product that was generated according to the information in the composition.

An "active learning module" shall be understood to mean a software program or a module of a software program that is designed to deliberately select a (comparatively small) subset of test compositions from a set of test compositions so that a particular strong learning effect occurs after the synthesis and the empirical measurement of the properties of this selected test composition, and after taking this data into consideration during the training of the neural network.

BRIEF DESCRIPTION OF THE DRAWINGS

Embodiments of the invention are described in greater detail in an exemplary manner in the following figures:

FIG. 1 shows a flow chart of a method for training a neural network and for using the trained network for forecasting properties and/or for forecasting a composition of a liquid medium;

DETAILED DESCRIPTION

Figure 2:
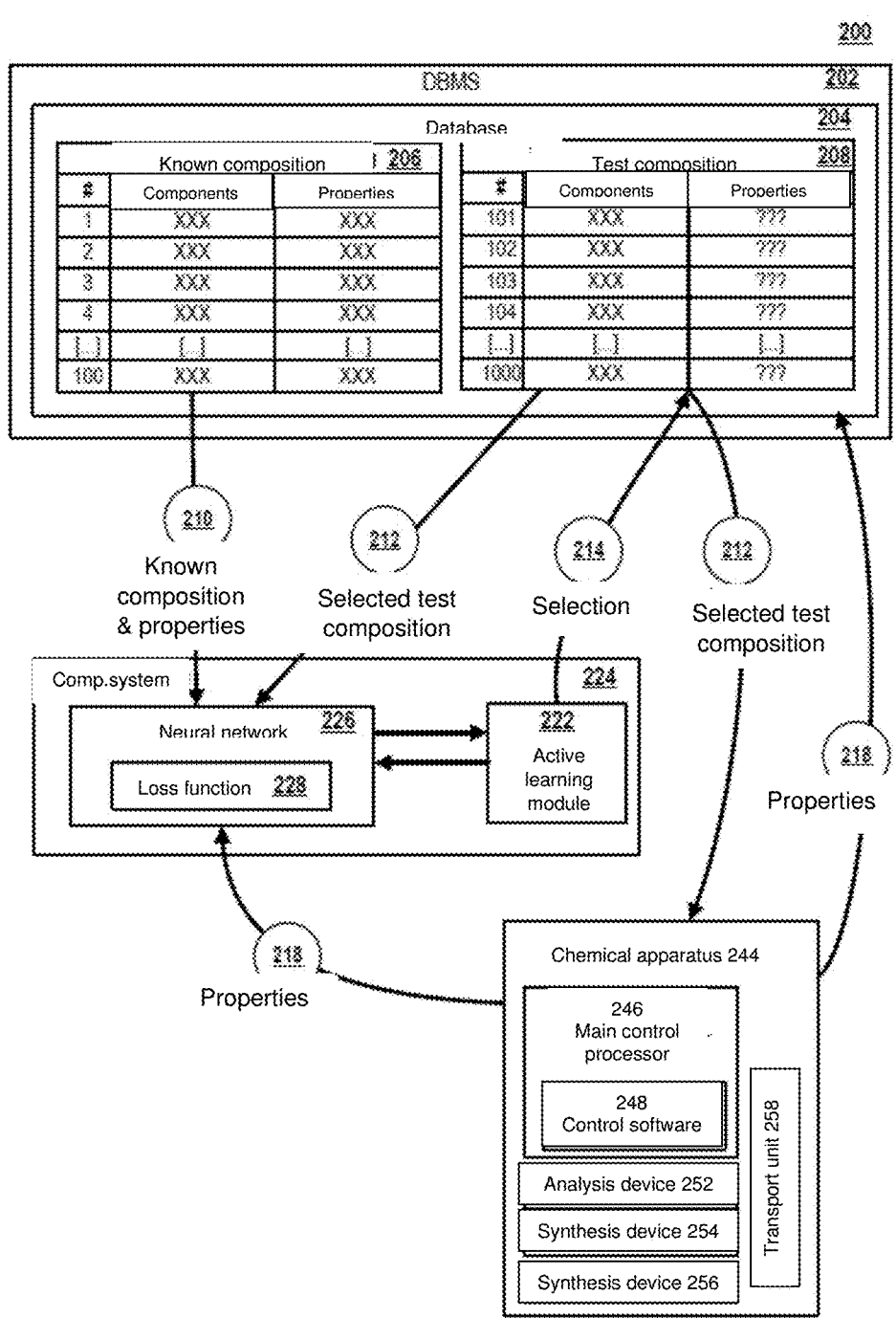
FIG. 2 shows a block diagram of a distributed system for training a neural network and for using the trained network.

FIG. 1 shows a flow chart of a computer-implemented method for generating a composition for paints, varnishes, printing inks, grinding resins, pigment concentrates or other coating substances. The method can be executed by a computer system 224, for example, as is shown in FIG. 2.

In a first step 102 a), previously known compositions are used as the "initial training data record" for training a convolutional neural network so as to forecast, in response to receiving an input vector that includes one or more desired properties of a chemical product of the above-described categories, a prediction composition that has these desired properties. The prediction composition specifies at least the type of components of which a chemical product of the aforementioned type (paints, varnishes, printing inks, grinding resins, pigment concentrates or other coating substances) is composed, and optionally also the respective quantities or concentrations thereof. A combination of a known composition with the previously known, empirically ascertained properties of the chemical product specified by this known combination represents an individual data point or data record within the collectivity of the initial training data.

In the next step 104 (b), an examination is carried out as to whether the value of a loss function meets a predefined criterion. Meeting the criterion expresses that the forecasting accuracy of the trained neural network is to be considered to be sufficient. Steps 106 to 112 described hereafter are selectively carried out in the case where the criterion is not met. Otherwise, the training is ended (step 114), and the fully trained neural network is returned.

In step 106, the active learning module selects a test composition from a set of predefined test compositions. A plurality of different active learning approaches exist, which can be used according to embodiments of the invention.

According to an implementation variant, the active learning module follows the "expected model change" approach, and selects the test composition that (when the network is newly trained, taking this test composition and the actually measured properties thereof into consideration) would change the present predictive model of the trained neural network the most.

According to another implementation variant, the active learning module follows the "expected error reduction" approach, and selects the test composition that would reduce an error of the present predictive model of the trained neural network the most.

According to another implementation variant, the active learning module follows the "minimum marginal hyperplane" approach, and selects the test composition that is closest to a separating line or separating plane spanned in a multidimensional data space by the present predictive model of the trained neural network. The separating line or separating plane are boundaries within the multidimensional data space in which the predictive model makes a classification decision, that is, assigns data points on the one side of the separating line or separating plane to a different class or category than the data points on the other side of the separating line. The proximity of the data points to the separating plane is interpreted such that the predictive model is uncertain with respect to a classification decision, and would benefit to a particularly high degree when actually measured data records (composed of a combination of components, and optionally the concentrations thereof and the measured properties of the chemical product generated according to this composition of the components) from the vicinity of this separating plane are additionally measured, so as to further train the neural network.

After one of the test compositions has been selected from the database, the computer system, in step 108, activates an apparatus for producing and examining chemical compositions, so that a chemical product according to the information in the selected test composition is automatically produced and examined. This examination shall be understood to mean metrologically detecting one or more properties of the chemical product, that is, for example, measuring the pH value, color value, viscosity or the like.

The actually measured properties obtained in step 108 are used to supplement the selected test composition, so that a complete further data point, consisting of a known composition and known properties, is created, which is used to expand the training data record used in a) or prior iterations. In step 110, the neural network is thus newly trained using an expanded training data record. Depending on the implementation variant, this can take place so that the training is again carried out in its entirety based on the expanded training data record, or the training in step 110 is carried out incrementally so that what was previous learned is preserved and only modified by taking the new training data point into consideration.

In step 112, a re-examination of the forecasting quality of the trained neural network is triggered, and steps 104 to 112 are repeated until the network has a sufficient forecasting quality, which is apparent from the fact that the loss function meets the criterion, that is, for example, the "error value" calculated by the loss function is below a predefined maximum value.

The completely trained neural network can now be used to very quickly and reliably forecast compositions that have one or more desired properties (a so-called "prediction composition"). For this purpose, a user, in step 116, inputs an input vector into the trained neural network, which specifies one or more of the desired properties. For example, the elements of the input vector can be composed of a numerical value or value range, which shall be understood as a desired or acceptable value or value range. For example, it may be a requirement to produce a varnish having a viscosity in a certain value range and a color in a certain color range.

Since the network learned the statistical correlations between components (and optionally also the concentrations thereof) and the properties of the resulting chemical product in several iterations based on a meaningfully and deliberately expanded training data record, the trained neural network can now, in step 118, forecast a prediction formulation that has the desired properties, and output this to the user and/or to a chemical apparatus for direct synthesis.

The goal of training the neural network is for the trained network to forecast a prediction composition based on an input set of desired properties and corresponding parameter value ranges, that is, a specification of at least the type and number, and optionally also the respective quantities of the components of a chemical product that has the desired properties. When the forecast is applied to a test composition, the components of which are known and the actual properties of which were empirically measured, there is thus either a correct or an incorrect forecasting result. As mentioned above, the "loss function" is used to assess the prediction quality of a trained neural network.

In the simplest case, a loss function (also referred to as "target function") for a forecasting problem, which can also be considered to be a classification problem, can, for example, only count the correctly identified forecasts from a set of forecasts. The higher the share of the correct forecasts, the higher is the quality of the predictive model of the trained neural network. For example, the question as to whether a rheological property, such as the viscosity, is within a predefined acceptable range can be considered to be a classification problem.

However, many alternative loss functions and corresponding criteria are also possible for assessing the forecasting accuracy of the trained neural network. For example, the network can receive desired properties in the form of an input vector and use this data to forecast the type of components of the composition. In these application cases, the neural network is to estimate a value, and not a class, that is, for example, the quantity of a component of a composition. These application cases are referred to as regression problems. A different target function is necessary for this purpose. For example, a loss function for regression problems can be a function that calculates how strongly the value forecast by the network differs from the actually measured value. For example, the loss function can be a function having an output value that positively correlates with the aggregate value of the deviation of each forecast component from an actually used component of a synthesized composition. The aggregate value can be an arithmetic mean, for example. For example, the quality of a trained neural network can be considered to be sufficient when these aggregate deviations (errors) of all components of a composition forecast by the network with respect to the actually used components are below a predefined threshold value. In this case, the neural network can be used to forecast unknown compositions that specify a chemical product that has one or more desired properties. When, in contrast, these aggregate deviations of the forecast components deviate more drastically from the actually used components than in the predefined maximum value, the active learning module is automatically prompted to expand the training data record by selecting a further test composition, by prompting the synthesis and property analysis thereof by the chemical apparatus, and by using the selected test composition, together with the properties measured therefor, as an additional data point in an expanded training data record for training the neural network again using the expanded training data record.

The input vector, which is formed during each iterative re-training based on the properties ascertained by the apparatus, includes the empirically measured properties of a product synthesized according to the selected test composition. The output vector includes a set of forecast components of the selected test composition so that the loss function can be used to compare the forecast components to the actual components of the test composition. The input vector used for testing the loss function is preferably the same during each iteration, so that changes of the error value calculated by the loss function can be attributed to changes in the predictive model of the network, and not to changes in the input vector. In some embodiments, the loss function is also applied to multiple test compositions having empirically known properties to broaden the data set during the determination as to whether the loss function meets a certain criterion.

After the training of the network is completed, the trained neural network can carry out the generation and output for the forecast of a prediction composition based on an input vector that specifies several desired properties and corresponding parameter value ranges. The output can take place to a user and/or to the apparatus and can automatically prompt the apparatus to produce a chemical product according to the prediction composition, and to empirically examine as to whether this composition has the desired properties.

Generally speaking, the described method can, in particular, be advantageous for calculating a prediction composition in the context of the production of paints, varnishes, printing inks, grinding resins, pigment concentrates and other coating substances, since a forecast of a suitable composition is hardly possible, given the plurality of components and the interactions thereof. For example, dispersants (also referred to as dispersing additives) are in general used to disperse solids (for example pigments, fillers or colorants) in liquid media so as to achieve effective dispersion of the solids, and reduce mechanical shearing forces required for dispersion, while achieving the highest possible fill levels. The dispersants support the breakup of agglomerates, and, serving as surface-active materials, wet and/or cover the surfaces of the solids or particles to be dispersed, stabilizing these against undesirable reagglomeration. During the production of paints, varnishes, printing inks, grinding resins, pigment concentrates and other coating substances, dispersants considerably simplify the incorporation of solids, such as pigments, colorants and fillers which, serving as important composition ingredients, considerably determine the visual appearance and the physicochemical properties of such installations. For optimal utilization, on the one hand, these solids have to be uniformly distributed in the compositions, while, on the other hand, the distribution, once achieved, has to be stabilized. A plurality of different substances are used today as dispersants for solids. In addition to very simple, low molecular weight compounds, such as lecithin, fatty acids, and the salts and alkylphenol ethoxylates thereof, more complex, high molecular weight structures are also used as dispersants. Here, it is specifically aminofunctional and amidofunctional systems that are widely used. The selection and concentration of the dispersant can have considerable influence on the properties of the product.

FIG. 2 shows a block diagram of a distributed system 200 for training a neural network 226, and for using the neural network for forecasting compositions, in particular compositions of paints, varnishes, printing inks, grinding resins, pigment concentrates or other coating substances.

The system comprises a database 204 including known compositions 206 and test compositions 208. As was already described above, the database, in the simplest case, can be composed of a memory area in which one or more files, for example text files or comma-separated files, are stored. In the embodiment shown in FIG. 2, the database 200 is the database of a database management system (DMBS), for example of a relational DBMS, such as MySQL. In particular in the case of larger data records, the use of a relational DBMS for managing and rapidly querying the data records is advantageous so that queries can be specified more precisely and executed more quickly. For example, the known compositions 206 can be stored in a first database table, and the test compositions 208 can be stored in a further database table. However, it is also possible to store all known compositions and test compositions in a single table, and the accordingly label the different types of data records using metadata/flags. A person skilled in the art can freely select the manner in which the data is filed, as long as the type of storage allows a logical distinction between the two composition types.

The known compositions 206 can, for example, be a set of data records that each include a composition that was already actually used at least once for synthesizing a corresponding chemical product, and that has the physical, chemical, haptic, optical and/or other metrologically detectable properties of the product. For example, the known compositions 206 can be the collectivity of those compositions that were already previously synthesized by a certain organization, or by a certain laboratory, or by a certain laboratory apparatus 244, and of which also at least several of the aforementioned metrologically detectable parameters were empirically recorded.

The known compositions 206 stored in the database 204 are thus characterized in that not only the components thereof (that is, the individual chemical ingredients and the respective quantities or concentration information thereof), but also at least several metrologically detectable properties of the chemical product, which was synthesized according to this composition, are known. Each known composition of a chemical product is thus represented in the database 204 in the form of a data record, which includes the components of this product and the aforementioned metrologically detected properties of this product.

In contrast, the test compositions 208 stored in the database 204 are compositions, the physical, chemical, haptic, optical and/or other metrologically detectable properties are not known, at least to the operator of the database and/or of the laboratory apparatus 244. This is indicated in FIG. 2 by question marks. A test composition is thus represented in the database 204 in the form of a data record which, even though it characterizes the components (that is, the individual chemical ingredients, and optionally also the respective quantities or concentration information thereof) of a chemical product, it does not characterize the aforementioned metrologically detectable properties of this product. For example, the aforementioned properties may not be available because the corresponding composition has never been used, or at least has not been used by the corresponding laboratory or the laboratory apparatus, for synthesizing a corresponding chemical product.

In some embodiments, the test compositions 208 can be manually created by a person skilled in the art and stored in the database. For example, based on his or her experience with the synthesis of paints and varnishes and the respective properties thereof, a chemist can specify new test compositions which the person skilled in the art expects to have these certain desired material properties. For example, the test compositions can be generated in that a person skilled in the art modifies a known composition by omitting or newly adding individual components. If the composition also encompasses concentrations of the one or more components ("formulation," "expanded composition"), such an expanded test composition can also be formed by modifying the concentrations of the components in known compositions.

In other embodiments, the test compositions 208 are created automatically and stored in the database 204. For example, each of the known compositions 206 can consist of 20 different chemical components. The test compositions 208 are now automatically generated by replacing individual components of the composition with other substances.

If the compositions are "expanded" compositions including concentration information, test compositions can also be formed by varying, that is, for example, increasing by 10% and/or decreasing by 10%, the quantities of individual components of the known compositions 206. If only a single component is varied at a time by using a quantity of this component that is increased by 10% and decreased by 10%, two variants are thus formed per component. In the case of 20 components, 40 test compositions are thus created by way of this method. The number of automatically generated test compositions is preferably even further increased by simultaneously increasing or decreasing the concentrations of two or more components by 10% compared to the concentrations thereof in the known composition. Purely combinatorially, it is thus possible to automatically generate $2^{20}=1,048,576$ expanded test compositions. The number of the test compositions can furthermore be drastically increased by using even more concentration variants, that is, for example, −20%, −10%, +10%, +20% for each of the 20 components, and/or by omitting or additionally using chemical components. The set of test compositions can thus be very large, in particular in the case of an automatic generation of the test compositions.

In some embodiments, the test compositions 208 comprise both manually created test compositions and automatically generated test compositions.

Automatically generating the test compositions can be advantageous, for example, since in this way a very large parameter space of components, and optionally also the concentrations thereof, can be rapidly covered, which typically, when a corresponding test compositions generation algorithm is used, covers the individual components and the concentrations thereof in a broad-based and wide-meshed manner.

The manually supplemented test compositions can be test compositions that a person skilled in the art, based on his or her expertise, expects to have a particularly high learning effect for the neural network, or the synthesis of which a person skilled in the art, for other reasons, expects to have benefits in terms of findings.

FIG. 2 hints at the generally large number of test compositions in that the database 204 includes only 100 known compositions, but 900 test compositions. The actual numerical ratio of known compositions to test compositions, however, is highly dependent on the individual case, that is, for example, on the number of compositions that were already generated by a certain laboratory and the chemical properties of which were already determined, on whether the database has integrated known compositions and the properties thereof from external sources, and/or on whether test compositions were created manually or automatically. As a result, it is certainly possible that the database 204 includes several 1000 known compositions. The set of test compositions is typically considerably larger than the set of empirical synthesis tests that a laboratory is actually able to physically carry out, in light of costs and economic efficiency.

The distributed system 200 furthermore comprises a computer system 224, which includes a neural network 226 and an active learning module 222. The active learning module 222 has access to the database 204. The access is at least a read access to be able to read out one or more selected test compositions and the components thereof from the database 204. According to some embodiments, the active learning module and/or a chemical apparatus 244, which synthesizes and metrologically analyses a chemical product according to the selected test compositions, also has permission to write to the database 204 to store the metrologically detected properties for the selected test compositions in the database. For example, storing the metrologically detected properties of a selected and newly synthesized test composition can cause this test composition to become a known composition, and to be stored accordingly in the database 204 in a different location and/or to be provided with other metadata ("flags"). For example, the DBMS 202 can be installed on a database server, so that the access of the active learning module and/or of the chemical apparatus 244 to the database 204 takes place via a network. The network can in particular be the Intranet of an organization, but can also be the Internet.

Other system architectures are also possible. For example, the database 204 or the DBMS 202 can also be an integral part of the computer system 224 or of the main control processor 246 and/or the neural network 226 and the active learning module 222 can be installed on different computer systems. Regardless of the actually selected architecture, an exchange of the data 210, 212, 214, 218, as is shown in FIG. 2, for example, has to be possible in such a way that all components participating in the method are able to obtain the required input data of other components. The data exchange can take place directly or indirectly via further components, such as gateways. For example, in some embodiments, the chemical apparatus can store the properties metrologically detected for the selected test compositions directly in the database 204 or only send these to the computer system 224, which then stores the properties in the database 204 so that the data record of the test compositions is supplemented by the properties, and thereby becomes a "known composition."

According to another alternative system architecture, the computer system 224 and the main control processor 246 are the same computer system.

According to embodiments of the invention, the computer system 224 is, or the components 226, 222 installed thereon are, designed to initially read out the known compositions 206 from the database, and to use the known compositions 206 as a training data record 210 for the initial training of the neural network 226. During the course of the training of the neural network, a predictive model of the neural network is generated, which, based on the training data record, maps the relationships between the components used for the synthesis of a chemical product (that is, between a composition) and the metrologically detected properties of the synthesized product. Using this predictive model obtained during the course of the training, the trained neural network, based on a desired property input in the form of an input vector, can forecast the composition that specifies a product presumably having the desired properties. For example, a desired property can be that the viscosity of the chemical product is within a certain parameter value range.

Due to the limited number of known compositions 206 and the properties thereof, the trained neural network 226 obtained after the initial training phase, in many instances, is not yet in a position to forecast the components of a composition based on a list of desired properties with sufficient reliability. The data set used is often too small for this purpose.

An expansion of the training data record by synthesizing all test compositions in the apparatus 244, and thereafter metrologically determining the properties thereof, is usually too expensive and/or too complex. According to embodiments of the invention, the use of the active learning module deliberately makes it possible to select just a few test compositions, and to have a corresponding chemical product synthesized and analyzed only therefor in the chemical apparatus 244, so as to expand the training data record with as few syntheses as possible (and thus the lowest costs and complexity possible) so that the predictive power of the predictive model of the neural network 226 is considerably enhanced by renewed training using the expanded training data record. After training the neural network again using the expanded data record, the predictive power of the neural network is examined again, using the loss function 228. If a predefined criterion is not met, that is, for example, if the loss value exceeds a predefined maximum value, this means that the quality of the neural network or of the predictive model thereof is still not high enough, and renewed training is to take place using an even more expanded training data record. In this case, the active learning module carries out a renewed selection step with respect to a test composition that was not yet previously selected and used for a synthesis of the corresponding medium. As described, a synthesis of the chemical product, based on the selected test composition, and a metrological detection of the properties of this product are carried out, so that the selected test composition, together with the measured properties, can be added as a new training data record to the existing training data so as to re-train the neural network 226 based on an even more expanded training data record. In multiple iterations, it is thus possible, through an automatic and deliberate selection of test compositions that promise a particularly drastic enhancement of the predictive model of the neural network, as well as through automatically executed synthesis and analysis steps based on the particular selected test composition, to quickly enhance the predictive power of the neural network in an efficient manner. When it is established after an iteration that the loss function meets the criterion, an expansion of the training data record is no longer necessary, since the predictive power of the trained neural network can be regarded as being sufficient.

Figure 3:
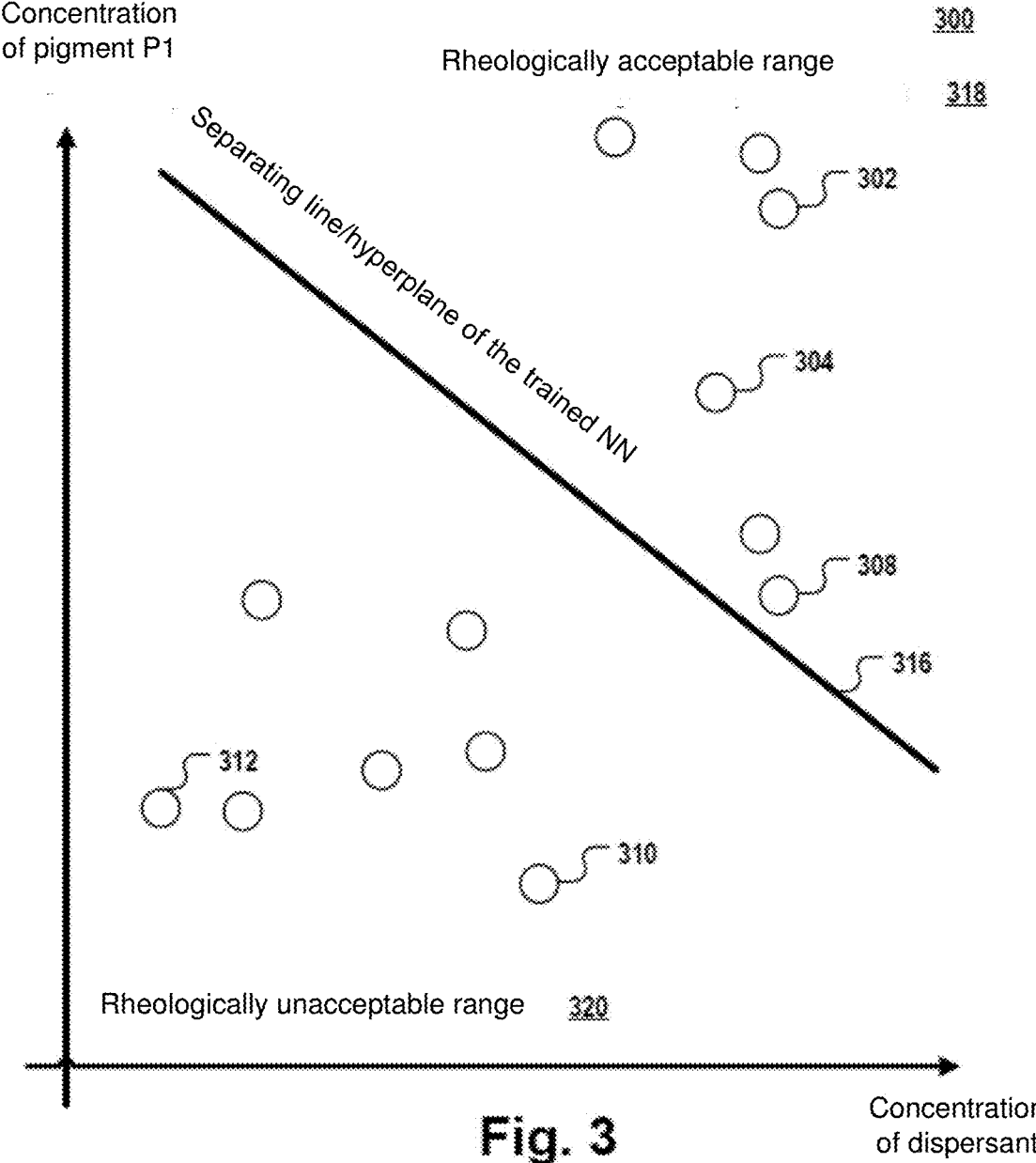
FIG. 3 shows a 2D section of a multidimensional data space from which the "active learning module" deliberately selects data points.

The identification of the test composition to be selected can, for example, take place as shown in FIG. 3. The active learning module 222 is configured to read out the identified test composition from the database 204 (for example using a SELECT command 214 to a relational database) and to transmit this to the chemical apparatus 244. The computer system 224 thus comprises an interface for communicating with the apparatus 224 and/or is an integral part of the apparatus. The apparatus is configured to synthesize a chemical product based on the selected test composition 212, and to measure one or more properties of the synthesized product. For example, the apparatus can comprise multiple synthesis devices 254, 256 or synthesis modules and multiple analysis devices 252 (or analysis modules), which each carry out one or more steps during the synthesis or analysis of chemical products or the intermediate stages thereof. The apparatus furthermore comprises one or more transport units 258, for example conveyor belts or robotic arms, which transport the components, intermediate products and consumables back and forth between the different synthesis and/or analysis units. The apparatus 244 comprises a main control processor 246 including control software 248 or is operatively coupled to such a processor 248 via a network. The control software 248 is configured to coordinate the synthesis, analysis and/or transport steps carried out by the synthesis and analysis units and the transport unit so that a chemical product according to the information in the selected composition 212 is synthesized, and the properties thereof are metrologically detected. The control software preferably stores the detected properties 218 of the newly synthesized selected composition (directly or mediated by the computer 224) in the database 204 so that the properties are stored, linked to the selected test composition. In the process, the "incomplete" data record of the selected test composition is supplemented by the properties metrologically detected in the apparatus 244, and thereby converted into a "known composition."

The properties 218 of the selected test composition are additionally transmitted to the computer system 244, so that a combination of the composition 212 selected by the active learning module and the properties 218 thereof yields a new complete data record, by which the collectivity of the training data is expanded. The neural network is re-trained based on the expanded training data set, and the effect of the expansion of the training data on the quality of the forecasts of the neural network is tested using the loss function 228. If the value of the loss function meets a predefined criterion, that is, for example, only has a loss value below a maximum value, the training can be ended. Otherwise, the result of the criterion examination is transmitted to the active learning module, which is prompted to select another test composition.

According to some embodiments, the apparatus 244 is, or multiple apparatuses for the synthesis and analysis of chemical products are, an integral part of the distributed system 200.

The apparatus 244 can be a high throughput environment apparatus (HTE apparatus), for example a high throughput environment apparatus for the analysis and production of paints and varnishes. For example, the HTE apparatus can be a system for automatically testing and for automatically producing chemical products, as is described in WO 2017/072351 A2.

Using the system shown in FIG. 2, a person skilled in the art can thus avoid having to synthesize and analyze a plurality of titration stages and component compositions in a non-deliberate and complex manner to obtain a sufficiently large training data record. Due to the enormous complexity of the dependencies of components, the respective combinations thereof and concentrations on one another, as well as the complexity of the dependencies of the different metrologically detectable properties of chemical products on the components thereof, and the concentrations thereof, it is generally hardly possible for a human skilled in the art to mentally detect the collectivity of all these dependencies, and to deliberately manually specify promising compositions. In light of the enormous size of the combinatorial realm of possibilities of components and concentrations, a human skilled in the art can always only actually empirically test a comparatively small and substantially randomly selected portion of this realm of possibilities. It has therefore, thus far, been inevitable to expend a great deal of time and material on the synthesis and analysis of compositions that ultimately had undesirable product properties and/or the use of which, as an integral part of a training data record, did not result in any noteworthy enhancement of the quality of a forecasting model of a neural network. By using an active learning module for deliberately selecting just a few test compositions, the process of providing a suitable training data record for the development of an accurate neural network can be significantly expedited.

In another advantageous aspect, according to embodiments of the invention, the system 200 can be used to provide a training data record that ideally supplements a historically evolved, existing set of known compositions through the deliberate selection of test compositions. The known compositions 206 can be compositions and the properties thereof that were synthesized and analyzed during the course of the operation of a laboratory or a laboratory apparatus, and the corresponding data of which was stored. The known compositions are therefore possibly not evenly distributed across the combinatorially possible space of compositions, and optionally also concentrations, but randomly result from the history of the operation of the laboratory or of the apparatus. The active learning module can be used and configured to supplement the predictive model of the neural network, which is initially formed based on the known compositions 206, by a small number of further experimental syntheses and analyses so that, for example, the components and concentrations, which are only insufficiently covered by the known compositions 206, are now covered by the deliberately selected test compositions.

After the iterative training of the neural network has ended, the trained neural network can be used to forecast compositions ("prediction compositions") that have certain metrologically detectable properties, that is, for example, are within a defined and desired value range with respect to a chemical or physical or other parameter. For this purpose, the desired properties are represented in the form of an input vector and input into the trained neural network. The neural network thereupon ascertains the type of components (and optionally also the quantity thereof) by way of which a chemical product having the desired properties can be generated. The prediction compositions can be automatically transmitted from the neural network to the apparatus 244, together with a control command to generate a chemical product according to the prediction composition. The control command can optionally also prompt the apparatus to automatically measure properties of this product, and to store the prediction composition, along with the properties obtained therefor, in the database, and to thereby expand the set of known compositions.

FIG. 3 shows a 2D section of a multidimensional data space 300 from which the "active learning module" deliberately selects data points 308 for expanding the training data record. During the course of the training, the neural network, based on an input vector that specifies the properties of a composition, learns to calculate an output vector, which represents a composition, that is, a specification of the components of a chemical product. According to embodiments of the invention, the properties specified in the input vector in particular includes the following properties as well as combinations of two or more of these properties: storage stability, pH value, rheology, in particular viscosity, density, relative mass, coloristics, in particular color strength, cost reduction during production, and improvement in the yield of pigments. The cost reduction during production can, for example, be automatically recorded by a chemical apparatus during the synthesis of a composition and refer, for example, to a predefined reference value. However, it is also possible for a human to manually record the costs. In general, it is possible to specify only those properties in the input vector which were also an integral part of the training data record used to train the neural network.

After the initial training of the neural network, the network, based on the known compositions, already learned certain relationships between components of the compositions and several properties. These learned relationships are illustrated here by the separating line 316, which divides the data space 300 with respect to the property "viscosity" into a data space 320 having rheologically acceptable product properties on the left below the separating line 318, and a data space 318 having rheologically unacceptable product properties on the right above the separating line. FIG. 3 can only represent a partial aspect of the data space 300 that is limited to two dimensions or two corresponding components ("Concentration of pigment P1" and "Concentration of dispersant"). The data space 300 is multidimensional per se; for example, it can have 20 corresponding dimensions in the case of 20 components, and each of these spaces formed by these 20 dimensions includes dedicated separating lines or multidimensional separation planes ("hyperplane") with respect to the particular considered property.

The data points shown as circles in FIG. 3 in each case represent one of the test compositions 208. The selection of one of the test data points can take place according to the so-called "minimum marginal hyperplane" approach. For example, the active learning module can be designed as a support vector machine or as another algorithm, which is able to divide a data space spanned by the test compositions into sub-spaces with respect to one or more properties (or components), based on the predictive model already learned by the neural network 226. The previously learned model of the neural network is thus represented by the separating line or separating plane 316 here. The minimum marginal hyperplane method assumes that the data points having the smallest distance from the separating line 316 are those in which the previously learned predictive model, represented by this very separating line 316, is the most uncertain, and thus the test composition belonging to this data point should be selected, synthesized, and analyzed to empirically determine the actual properties, for example the viscosity here. In the example shown here, the active learning model, solely taking the property "viscosity" into consideration, would thus select the test composition represented by the data point 308, and prompt the chemical apparatus 244 to synthesize and analyze this composition so as to expand the training data by the components of this test composition and the empirically measured properties thereof, and to improve the neural network by training it using the expanded training data record. It is possible, for example, that the empirical measurement of the composition represented by point 306 shows that the viscosity thereof is in the rheologically unacceptable range 320. The result of retraining, using the expanded training data record, would thus be that the predictive model of the neural network, graphically visualized here by the separating line 316, adapts so that in the future the forecast for a composition such as that represented by point 306 is that the viscosity thereof is in the range 320. As a result of the renewed training using the expanded training data record, the separating line/separating plane 316 would thus be modified so that the line or plane is given a "bulge" toward the top right, so that the improved neural network would now have recognized and forecast that the composition represented by point 308 is in the rheologically unacceptable range 320. In practice, the distance between the corresponding data points and the separating lines of multiple properties is preferably considered in the selection of the data point, or of the corresponding test composition, for example in that the data point having the minimum average distance from all separating lines/separating planes of the data space 300 is selected.

Figure 4:
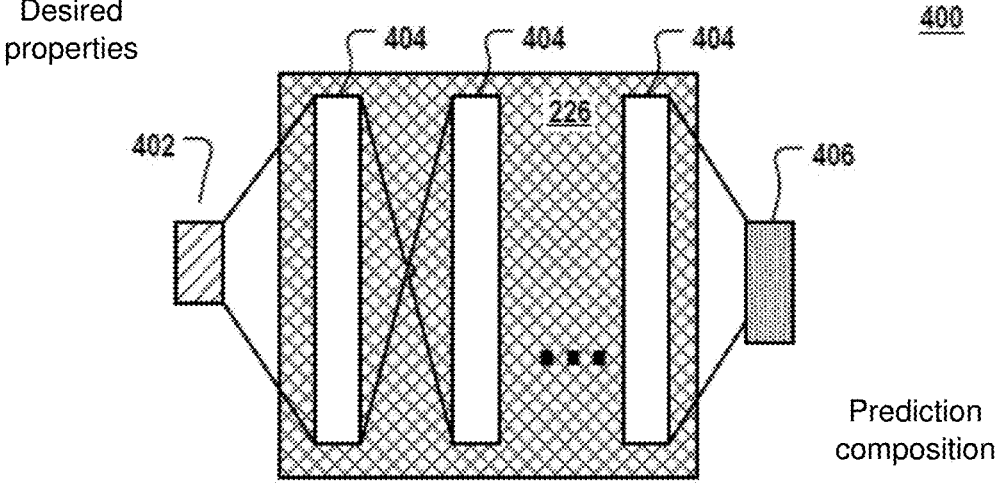
FIG. 4 shows the architecture of a neural network including input and output vectors.

FIG. 4 shows the architecture of a trained neural network which is configured and trained to receive an input vector 402 as input, and to calculate an output vector 406 therefrom and output it. The input vector specifies the desired properties or the corresponding parameter value ranges of a composition, the components of which (and optionally also the concentrations or quantities of the respective components) are to be forecast (predicted) by the neural network. The output vector 406 specifies the components of a prediction composition, and optionally also the quantities or concentrations of these components in the prediction composition, wherein a prediction composition is a composition which the neural network forecasts to have properties that are within the parameter value ranges predefined in the input vector. The network comprises multiple layers 404 of neurons, which are linked to the neurons of other layers by way of weighted mathematical functions so that the network, based on the desired properties specified in the input vector, is able to calculate, that is, forecast, the components of the corresponding composition, and is able to output these components, and thus the prediction formulation itself, in the form of an output vector 406.

Prior to the training, the neurons of the neural network are first initialized with predefined or random activations (weights). During the training, the network receives an input vector, which represents empirically measured properties of a known composition, calculates the output vector including forecast components (and optionally component quantities) of this composition, and is penalized by the loss function for deviations of the forecast components from the actually used components. The ascertained forecasting error is distributed back to the particular neurons by way of a process referred to as backpropagation, and causes the activations (weights) of certain neurons to change so that the forecasting error (and thus the value of the loss function) decreases. Mathematically, the gradient ascent of the loss function can be determined for this purpose, so that the activations of the neurons are modified in a directed manner, so that the value output by the loss function is minimized. As soon as the forecasting error or the loss function value is below a predefined threshold value, the trained neural network is considered to be sufficiently precise, so that further training is not required.

For example, the task may be to generate a new, unknown composition that has a certain viscosity in the value range VWB, a certain color in the value range FWB, and abrasion resistance in the value range AWB. Before this composition is actually synthesized in the laboratory, the neural network is to be used initially to automatically ascertain the components of a composition that specifies the components of a chemical product in which viscosity, color and abrasion resistance are within the desired value ranges VWB, FWB, and AWB. If no prediction composition having properties that are within the desired value ranges is found, the synthesis can be dispensed with from the outset, and costs can be saved. It may be useful here to change the specifications with respect to the properties.

The components of this new composition, and optionally also the respective desired concentration thereof, are output as the output vector 406 of the neural network to a user for manual evaluation and/or to a chemical apparatus. The output vector can, for example, include 20 components of a prediction composition, with respect to which the neural network predicted that these, or the chemical product synthesized according to the prediction composition, has the desired properties. The input properties are properties that were also already taken into consideration during the training of the neural network. Depending on the type of composition or the properties considered to be relevant, the vectors 402, 406, in other embodiments, can also comprise a higher or lower number of elements.

LIST OF REFERENCE NUMERALS

102-118 steps
200 distributed system
202 DBMS
204 database
206 known compositions having properties
208 test compositions (properties unknown)
210 originally used training data record
212 selected test composition 214 selection command with respect to a test composition
218 empirically ascertained properties of the selected test composition
222 active learning module
224 computer system
226 neural network
228 loss function
244 chemical apparatus
246 main control processor
248 control software
252 analysis device
254 synthesis device
256 synthesis device
258 transport unit
300 2D section of a multi-parameter data space of the test compositions
302-312 data point (each represents a test composition)
316 separating line of the predictive model of the trained neural network
318 rheologically acceptable range
320 rheologically unacceptable range
400 structure of neural network
402 input vector
404 layers of the neural network
406 output vector

The invention claimed is:

1. A method for generating a composition for paints, varnishes, printing inks, grinding resins, pigment concentrates or other coating substances, the composition being generated by a computer system, the computer system having access to a database, known compositions, together with components and properties thereof, being stored in the database, and the computer system being connected to an apparatus for producing and examining compositions for the paints, the varnishes, the printing inks, the grinding resins, the pigment concentrates or the other coating substances, the computer system comprising a convolutional neural network and an active learning module, comprising the following steps:
  a. using training data stored in the database, to train the convolutional neural network, the training data including known compositions, and a loss function being minimized for the training;
  b. examining whether a value of the loss function meets a predefined criterion,
  c. selectively re-training the convolutional neural network based on the examining determining that the criterion is not met, the re-training including the following steps being carried out:
    i. selecting a test composition from a set of predefined test compositions by the active learning module, wherein a metrologically detectable property of the test composition is not stored in the database;
    ii. activating, by the computer system, the apparatus such that the apparatus produces the selected test composition and such that the apparatus measures the properties of the selected test composition by examining the selected test composition to determine the metrologically detectable property of the test composition;
    iii. supplementing the training data using the selected test composition and the properties of the selected test composition actually detected by the apparatus;
    iv. training the convolutional neural network using the training data supplemented with the selected test composition and the properties of the selected test composition actually detected by the apparatus; and v. repeating step b and selectively repeating step c;
  d. generating a prediction composition for the paints, the varnishes, the printing inks, the grinding resins, the pigment concentrates or the other coating substances by inputting an input vector into the convolutional neural network; and
  e. outputting the prediction composition by the convolutional neural network.

2. The method according to claim 1, wherein the set of the predefined test compositions is automatically generated by a test planning program.

3. A method according to claim 1, wherein the components are selected from a group consisting of solids, binders, solvents, resins, hardening agents and various additives,
  the solids including at least one of pigments or fillers, and
  the various additives include at least one of thickeners, dispersants, wetting agents, adhesion promoters, defoamers, surface modifying agents, leveling agents, catalytically active additives, and specially acting additives.

4. A method according to claim 1, wherein the known compositions comprise solids and dispersants.

5. A method according to claim 1, wherein the properties are selected from a group consisting of storage stability, pH value, rheology, viscosity, density, relative mass, coloristics, color strength, cost reduction during production, and improvement in a yield of pigments.

6. A method according to claim 1, wherein the prediction composition is output on a user interface of the computer system.

7. A method according to claim 1, wherein the apparatus comprises at least two processing stations, the at least two processing stations being connected to one another via a transport system on which self-propelled transport vehicles can travel between the processing stations for transporting the components of the composition and/or produced compositions, the method furthermore comprising:
  inputting a composition into a processor which controls the apparatus, the composition input into the processor being the selected test composition or the prediction composition, the processor activating the apparatus to produce the input composition, the production of the input composition and a measurement of the properties of the input composition being carried out in the at least two processing stations, whereupon the measured properties are output on a user interface of the computer system and/or the measured properties are stored in the database.

8. A method according to claim 1, wherein the computer system communicates via a communication interface with the database and/or the apparatus for producing and examining compositions for the paints, the varnishes, the printing inks, the grinding resins, the pigment concentrates or the other coating substances, wherein the communication interface is implemented by USB, Ethernet, WLAN, LAN, Bluetooth or another network interface.

9. A method according to claim 1, wherein the compositions are formulations.

10. A computer system configured to control an apparatus for generating a composition for paints, varnishes, printing inks, grinding resins, pigment concentrates or other coating substances, the computer system comprising:
  a database storing known compositions, together with components and properties thereof;
  a user interface configured to provide an output of the computer system to a user;

a processor; and a non-transitory digital storage medium including instructions executable by the processor to carry out a method according to claim 1.

11. A non-transitory digital storage medium including instructions executable by a processor for carrying out a method according to claim 1.

12. A system, comprising:

an apparatus for producing and examining compositions for paints, varnishes, printing inks, grinding resins, pigment concentrates or other coating substances, the apparatus comprising at least two processing stations, the at least two processing stations being connected to one another via a transport system on which self-propelled transport vehicles can travel between the at least two processing stations for transporting the components of the composition and/or the produced composition; and a computer system according to claim 10.

* * * * *